(12) United States Patent  (10) Patent No.: US 7,997,061 B2
Marche  (45) Date of Patent: Aug. 16, 2011

(54) TURBOJET ENGINE FOR AIRCRAFT, PROPULSION UNIT COMPRISING SUCH A TURBOJET ENGINE AND AIRCRAFT COMPRISING SUCH A PROPULSION UNIT

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 1396 days.

(21) Appl. No.: 11/490,195

(22) Filed: Jul. 20, 2006

(65) Prior Publication Data

US 2010/0237200 A1   Sep. 23, 2010

(30) Foreign Application Priority Data

Jul. 28, 2005  (FR) .................................... 05 52343

(51) Int. Cl.
  *F02C 6/04*   (2006.01)
  *F02K 3/04*   (2006.01)
(52) U.S. Cl. ............................. 60/266; 60/785; 60/797
(58) Field of Classification Search .................. 60/266, 60/267, 782, 785, 797
  See application file for complete search history.

(56) References Cited

U.S. PATENT DOCUMENTS

| | | | | |
|---|---|---|---|---|
| 4,791,782 A | * | 12/1988 | Seed | 60/226.1 |
| 5,123,242 A | * | 6/1992 | Miller | 60/266 |
| 5,203,163 A | * | 4/1993 | Parsons | 60/266 |
| 5,438,823 A | * | 8/1995 | Loxley et al. | 60/39.08 |
| 5,729,969 A | | 3/1998 | Porte | |
| 5,782,077 A | | 7/1998 | Porte | |
| 6,000,210 A | * | 12/1999 | Negulescu | 60/39.08 |
| 6,067,792 A | | 5/2000 | Tubbs | |
| 6,415,595 B1 | * | 7/2002 | Wilmot et al. | 60/266 |
| 7,607,308 B2 | * | 10/2009 | Kraft et al. | 60/785 |
| 2008/0006021 A1 | * | 1/2008 | Schwarz | 60/204 |

FOREIGN PATENT DOCUMENTS

| | | |
|---|---|---|
| DE | 2153929 A1 | 5/1973 |
| EP | 0469825 A2 | 2/1992 |
| EP | 0469827 A1 | 2/1992 |

* cited by examiner

*Primary Examiner* — Ted Kim

(74) *Attorney, Agent, or Firm* — Patterson Thuente Christensen Pedersen, P.A.

(57) ABSTRACT

A propulsion unit comprises a turbojet engine and a thermal exchanger, situated above the turbojet engine. The turbojet engine comprises a regulation device to regulate an air flow-rate in a cooling air lead-in conduit conveying a stream of cooling air into a thermal exchanger, The regulation device regulates the air flow-rate upstream with respect to the cooling air lead-in conduit.

9 Claims, 3 Drawing Sheets

TURBOJET ENGINE FOR AIRCRAFT, PROPULSION UNIT COMPRISING SUCH A TURBOJET ENGINE AND AIRCRAFT COMPRISING SUCH A PROPULSION UNIT

RELATED APPLICATION

This application claims priority to French Application No. FR 05 52343 filed Jul. 28, 2005.

BACKGROUND OF THE INVENTION

1. Field of the Invention

The invention relates to a turbojet engine for aircraft. More specifically, the invention relates to a regulation device used to regulate a flow-rate of cooling air in a thermal exchanger situated above the turbojet engine.

2. Background of the Invention

There are known ways of supplying an air-conditioning circuit in an aircraft pressurized cabin with a stream of compressed hot air tapped at the compressor of a turbojet engine. This stream of hot air is at least partially cooled by means of a cooling air stream tapped from the fan channel of the turbojet engine before it is injected into the air-conditioning circuit. The thermal exchange between the stream of hot air to be cooled and the stream of cooling air takes place in a thermal exchanger. The thermal exchanger comprises a case, generally rectangular, in which the stream of hot air and stream of cooling air circulate and cross each other.

In flight, the turbojet engines of an aircraft may work at different rates, depending on the needs of said aircraft, the rotational speed of the turbojet engines depending on the power requirements of the aircraft. For example, for takeoff, the aircraft needs maximum power and the turbojet engine then rotates at maximum speed. Conversely, during the descent and cruising stages of the aircraft, it is not necessary to have high power for the turbojet engines. This means that the rotational speed of said turbojet engines can be low. The compression and the air temperature in a turbojet engine depend on the power of said turbojet engine. Thus, the hot air tapped from the turbojet engine for injection into the air-conditioning circuit must be cooled to an extent that depends on its initial temperature.

In order to modulate the cooling of the hot air intended for the air-conditioning circuit, there are known ways of playing on the flow-rate of the cooling air stream in the thermal exchanger. For this purpose, a regulation device is used. This regulation device is directly positioned in a cooling air lead-in conduit that brings cooling air from the turbojet engine to the thermal exchanger. Generally, the cooling air lead-in conduit is formed by a circular-sectioned tube. The regulation device has a circular plate whose external contour substantially follows an internal contour of the cooling air lead-in conduit, and a rod around which the circular plate can rotate. The rod diametrically crosses the circular plate and is fixed by its two ends to the wall of the cooling air lead-in conduit. In the shutting position, the circular plate is positioned so that it faces the cooling air lead-in conduit, the axis of the circular plate being superimposed on the axis of said conduit, said circular plate completely shutting the conduit. In the open position, the circular plate of the regulation device is positioned in profile in the cooling air lead-in conduit so that the cooling air stream can pass from one side to the other of the circular plate and flow along the cooling air lead-in conduit. A quarter-turn rotation of the circular plate about the rod opens or closes the regulation device as needed. An electromechanical control system is used for the remote control of the regulation device so as to modulate the cooling air stream within the cooling air lead-in conduit so that the quantity of cooling air within the thermal exchanger corresponds to the quantity of cooling air needed to lower the temperature of the hot air stream to the desired temperature.

One drawback of a prior art regulation device such as this is that it generates hissing sounds which may be significant. Indeed, a front portion of the cooling air lead-in conduit is situated between the cooling air tapping zone and the circular plate. When the regulation device is closed, i.e. when the circular plate prohibits the passage of the cooling air stream, this front portion of the cooling air lead-in conduit forms a dead zone due to a stream of cooling air being sucked into said front portion.

It is an aim of the invention to provide a device capable of modulating the flow of a cold air stream, as needed, in an air passage channel designed to convey the flow of cold air into a thermal exchanger. It is another aim of the invention to provide a device of this kind that is of an easy design. It is an additional aim of the invention to provide a device of this kind that does not have the drawbacks of the prior art devices, and especially does not create a dead zone liable to emit hissing noises.

To this end, the invention proposes the making of a modulation device to modulate the stream of cold air in a thermal exchanger that is positioned no longer in the air passage channel supplying the thermal exchanger with cold air but upstream to this air passage channel, at the level of the cold air tap, i.e. directly at the level of the flow of air into the turbojet engine. Thus, when the modulation device is open, a stream of cold air gets sucked into the cold-air passage channel. When the modulation device is closed, all the cold air flows along the turbojet engine, in sliding along the modulation device but without being even partially deflected. No stream of cold air can penetrate the air passage channel when the modulation device is closed.

Advantageously, the cold air stream modulation device is made in a pre-existing part of the turbojet engine. The modulation device is, for example, made on a fixed vane located at the exit of the fan of the turbojet engine. Indeed, a turbojet engine is provided with a plurality of fixed vanes, located downstream with respect of the fan and designed to bring the whirling air stream coming out of said fan into the axis of the turbojet engine. The fixed vanes are static, rectilinear parts in the turbojet engine whose function in the prior is the purely aerodynamic one of imposing a direction on the air stream in the turbojet engine. The invention uses at least one of these fixed vanes, situated so as to be facing the flow of the air stream from the turbojet engine, to form the inlet of the cold air passage channel designed to supply the thermal exchanger. The air stream coming from the fan, and designed to flow into the turbojet engine, first flows along the fixed vanes. Thus, a portion of this air stream may be diverted and made to go through an internal volume of the vane in order to be brought into the thermal exchanger.

The regulation device comprises, for example, an aperture shut by a door whose travel may vary according to needed. This aperture lets a portion of the air stream through into the air passage channel. This deflected air stream is then conveyed to the thermal exchanger. Should the modulation device be made on a fixed vane, the structure of said vane is modified so as to present an internal volume. It is then enough to make an aperture on one of the flanks of this hollow structural section so that, once the aperture is made, the cold air stream can rush into it. The vane thus forms the inlet to the air passage channel, the internal volume of said vane forming a front part of said channel. The air passage channel continues up to the thermal exchanger into which it leads.

SUMMARY OF THE INVENTION

An object of the invention therefore is a turbojet engine for aircraft comprising a regulation device to regulate an air flow-rate in a cooling air lead-in conduit conveying a stream of cooling air into a thermal exchanger, wherein the regulation device regulates the air flow-rate upstream with respect to the cooling air lead-in conduit. Thus, no air stream can penetrate the cooling air lead-in conduit when the regulation device is closed.

In different exemplary embodiments of the turbojet engine of the invention, it is possible to provide for all or part of the following additional characteristics:
  the regulation device is made on an air-stream guiding blade at the outlet of the fan of the turbojet engine, an internal volume of the guiding blade at least partially forming the cooling air lead-in conduit,
  the regulation device is made on the central guiding blade situated in the axis of the turbojet engine,
  the central guiding blade is fixedly joined to a bifurcation situated at the rear end of the fan, said bifurcation separating the air stream into two secondary streams flowing respectively along the left flank and the right flank of a fastening mast that connects the turbojet engine to the wing structure of the aircraft,
  the regulation device comprises a door made on the guiding blade, the door being capable of having at least two stable positions, respectively a closed position in which in no air stream can penetrate the cooling air lead-in conduit and an open position in which an air stream can penetrate the cooling air lead-in conduit.
  the regulation device comprises an actuation system capable of modulating the air flow-rate in the cooling air lead-in conduit according to the cooling air requirements of the thermal exchanger.
  the actuation system comprises a link-rod to open and close the door.
  the door has internal travel.
  the door has external travel.

The invention also relates to a propulsion unit for aircraft comprising a turbojet engine according to the invention.

The invention also relates an aircraft comprising at least one propulsion unit according to the invention.

BRIEF DESCRIPTION OF THE DRAWINGS

The invention will be understood more clearly from following description and from the accompanying figures. These figures are given pure only the by way of an indication and in no way restrict the scope of the invention. Of these figures.

MORE DETAILED DESCRIPTION

Figure 1:
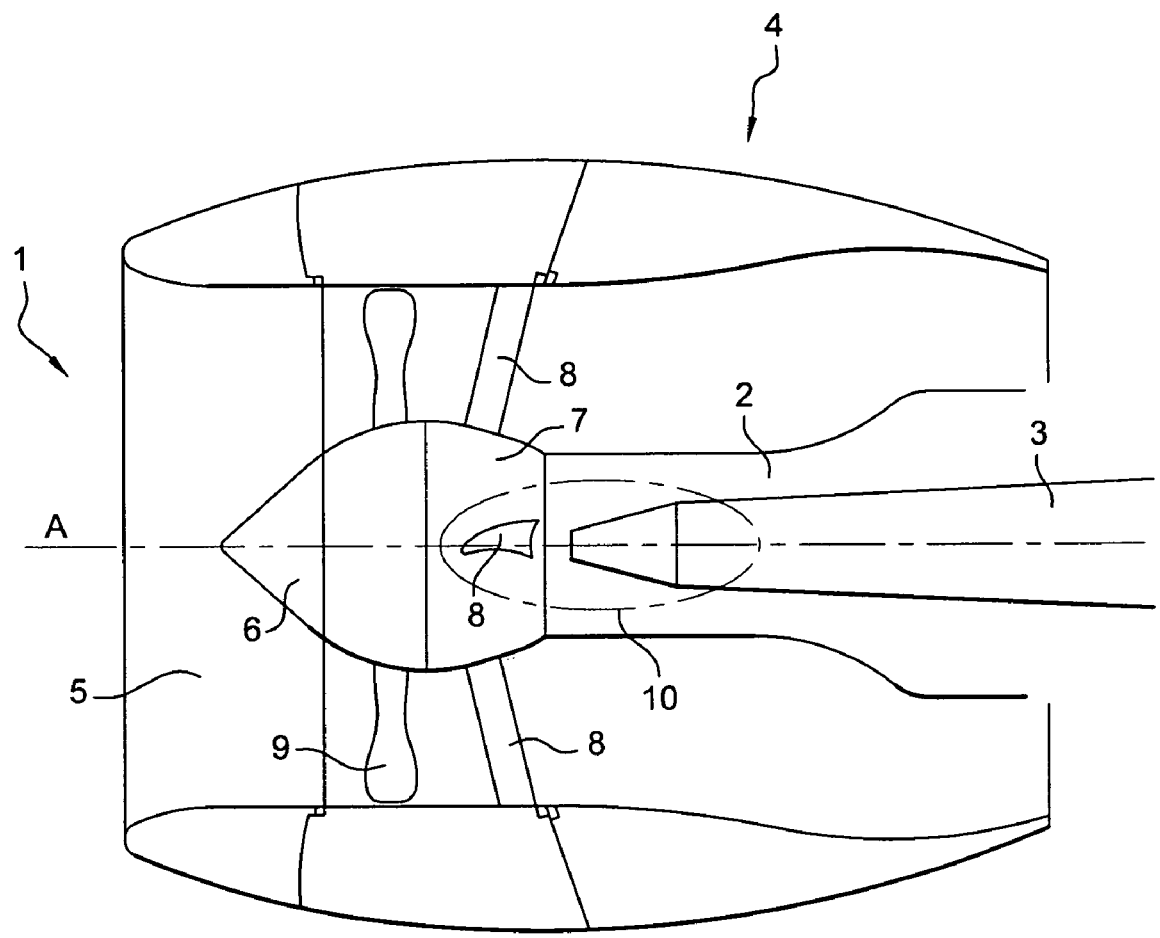
FIG. 1 is a schematic top view of a partially opened pod and a mast carrying said pod.

FIG. 1 shows a pod 1. The pod 1 has a turbojet engine housed in a hood 4. A fastening mast 3 joins the turbojet engine to the wing structure of an aircraft (not shown. The area in which the mast 3 is fastened to the turbojet engine 2 forms the bifurcation 10 separating the air stream into two secondary streams flowing respectively along the left flank and the right flank of the fastening mast 3. The bifurcation 10 is a fixed fairing that extends along the hood 4 and connects said hood 4 to the turbojet engine 2.

A front part 5 of the hood 4 forms an inlet by which air penetrates the turbojet engine to. A fan 6 bearing rotating blades 9 transmits pressure to the air stream which has to go through the pod 1. A fixed rear end 7 of the fan 6 carries static blades 8 whose function is to rectify the air stream in order to give it a single direction, parallel to the axis A of the turbojet engine 1. Only three static, guiding blades 8 are shown in FIG. 1. The static guiding blades 8 extend radially all along the external perimeter of the rear end 7 of the fan 6. The air stream penetrating the pod 1 flows towards the turbojet engine 2 in sliding along the guiding blades 8.

Figure 2:
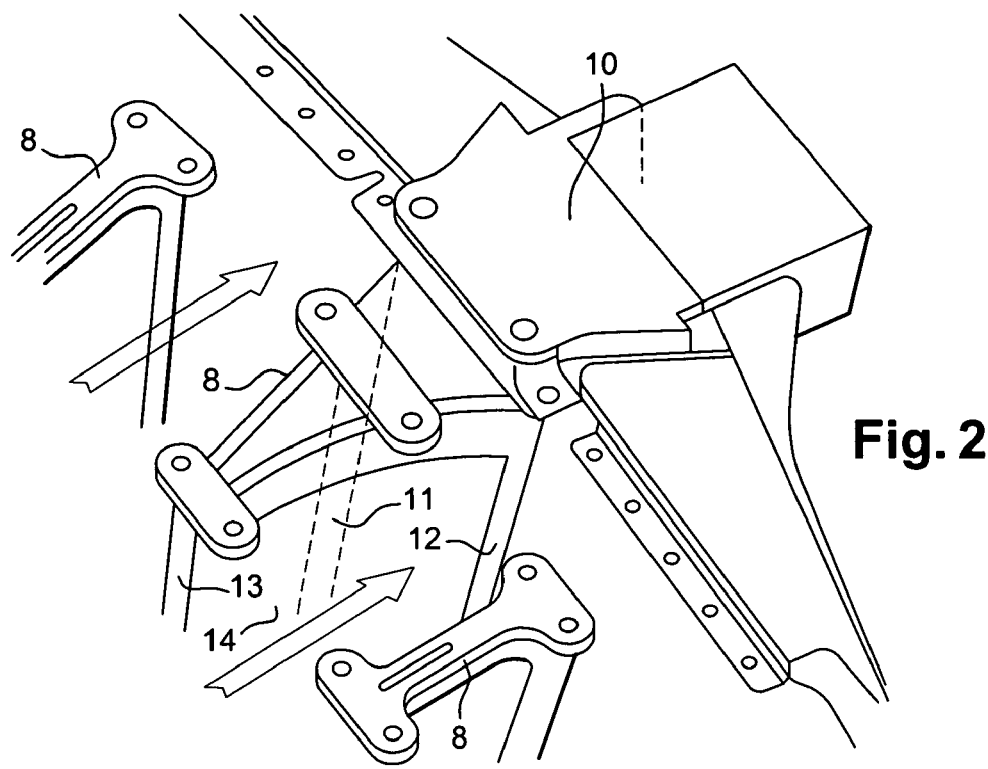
FIG. 2 shows the regulation device according to the invention in closed position.

FIG. 2 shows a more detailed view of the guiding blades 8. One of the guiding blades 8, framed by the other two blades 8 in FIG. 2, has been modified so as to have a greater thickness then the other guiding blades 8. This central guiding blade 8 extends in the axis of the bifurcations 10. The central guiding blade 8 has a hollow triangular section and an internal volume demarcated by three vertical shafts 11,12,13. The vertical shafts 11,12,13 of the central guiding blades 8 are fixed by a bottom end to the rear end of the fan of the turbojet engine (not shown in FIG. 2). A first panel extends between the adjacent vertical shafts 11 and 13 and a second panel extends between the adjacent vertical shafts 12 and 13. The panels are situated so as to be facing the flow of the air stream and close the internal volume of the central guiding blade 8. The central guiding blade 8 is extended towards the rear relative to the other guiding blades 8, so as to be fixedly joined to the bifurcations 10.

The regulation device of the invention is made on the central guiding blade 8. The internal volume of the central guiding blade 8 forms the inlet of the cooling air lead-in conduit and is used to conveying a cooling air stream from the rear end of the fan, in which the guiding blades 8 are situated, up to a thermal exchanger (not shown) situated for example above the fastening mast. The cooling air lead-in conduit goes through the bifurcations 10.

Figure 3:
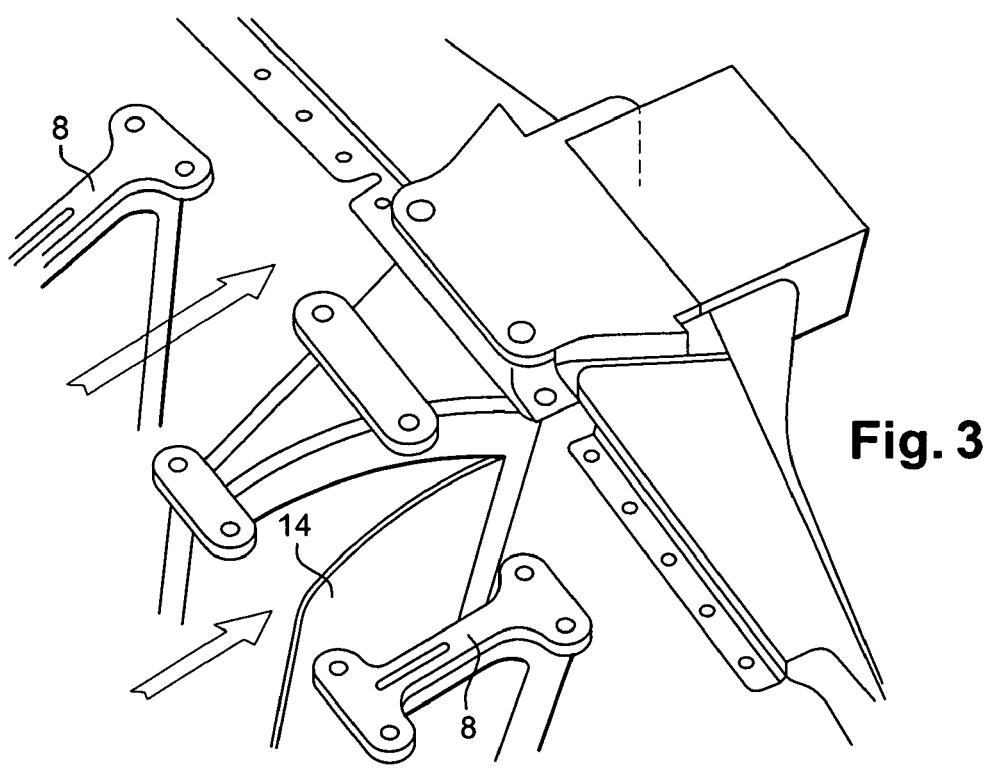
FIG. 3 shows the regulation device according to the invention in open position.

The regulation device has a door 14 made in one of the panels of the central guiding blade 8 and positioned so as to face the flow of the air stream. The door 8 is therefore situated before the cooling air lead-in conduit, which it shuts. In FIG. 2, the door 14 is closed, thus blocking any access to the internal volume of the central guiding blade 8. The air stream flows along the guiding blades 8 which rectify said stream. In FIG. 3, the door 14 is partially open. A cooling air stream can therefore penetrate the internal volume of the central guiding blade 8.

According to exemplary embodiment of the invention, the door 14 may be made on the entire height of the central guiding blade 8, or on one part only. The term "height" is understood to mean the size of the blade 8 from the top end, connected to the hood, up to the bottom end, connected to the rear end of the fan. Similarly, it is possible to make the door 14 so that it has external travel, as shown in FIG. 3, or internal travel. The term "external" is understood to mean directed towards the exterior of the internal volume of the central guiding blade 8. The term "internal" is understood to mean directed toward the interior of the internal volume. It is also possible to enable internal and external play in the door 14 of the regulation device according to the invention.

Depending on the cooling air requirements of the thermal exchanger, the door 14 is open or closed. It also possible to play on the travel of the door 14, i.e. its degree of opening, to permit the passage of a greater or smaller quantity of air. Thus, it is possible to completely stop the supply of cooling air by closing the door 14, or to play on the flow-rate of cooling air by opening the door 14 to a greater or smaller extent.

Figure 4:
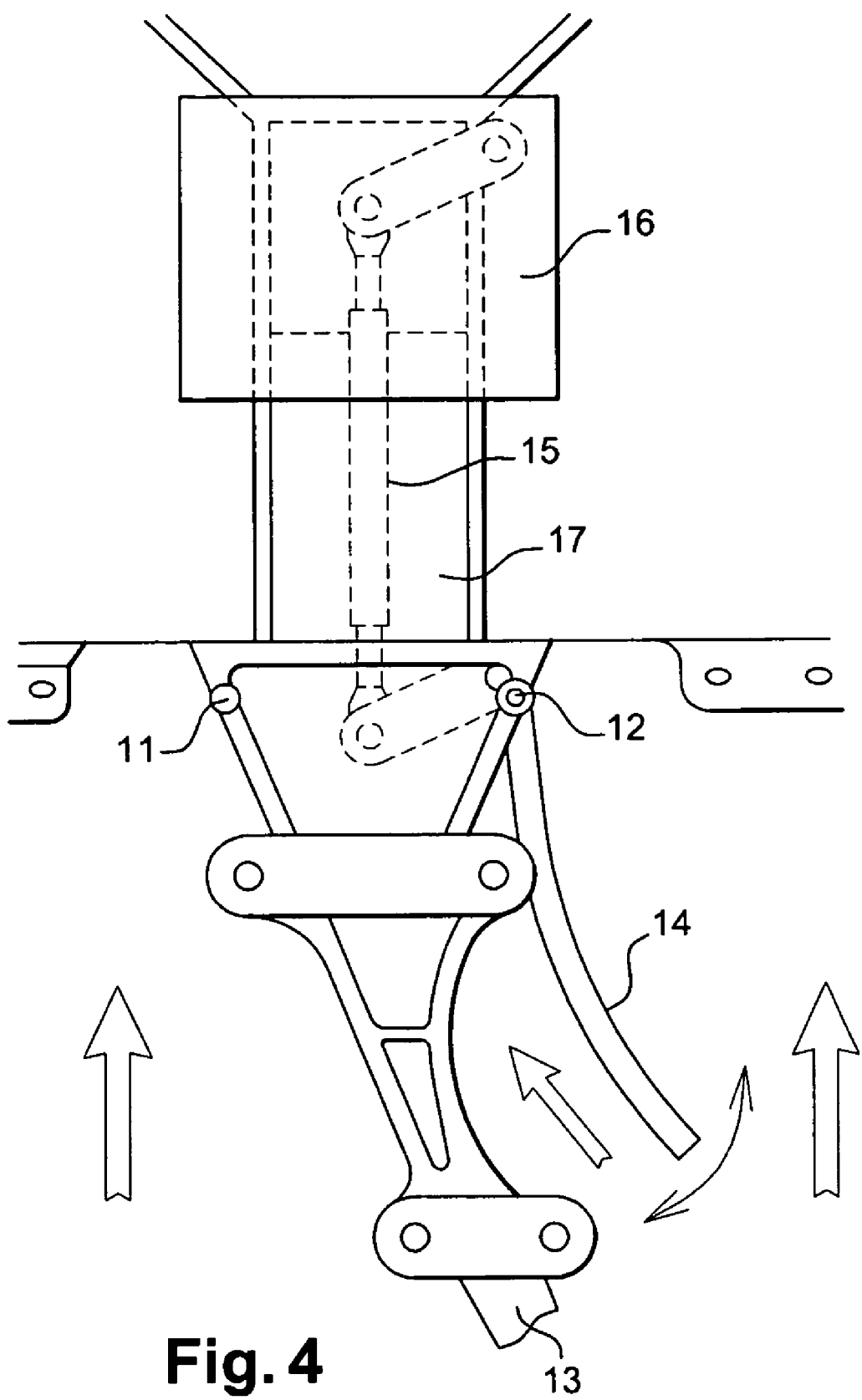
FIG. 4 is a top view of the regulation device according to FIG. 2.

FIG. 4 shows only the central guiding blade 8, provided with the regulation device of the invention. The opening and closing of the door 14 is controlled by an actuation system. The actuation system comprises a link-rod 15 housed in a casing 16 situated above the cooling air lead-in conduit 17. The link-rod 15 is used to open and closed the door 14 depending on the cooling air requirements of the thermal exchanger. The actuation system may comprise sensors capable of evaluating the power of the motor, the temperature of the hot air stream to be cooled in the thermal exchanger and the necessary flow-rate of cooling air. The link-rod 15 opens and closes the door 14 according to the data from the sensors.

What is claimed is:

1. A propulsion unit comprising:
   a turbojet engine including—
      a fan having an airstream inlet, a plurality of rotating blades, and an airstream outlet,
      a static, air-stream guiding blade positioned at the airstream outlet of the fan, the guiding blade having an interior volume bounded by one or more panels;
   a thermal exchanger positioned above the turbojet engine;
   a cooling air lead-in conduit adapted to supply the thermal exchanger with cool air tap, the cooling air lead-in conduit being in fluid communication at a first end with the interior volume of the guiding blade, and the thermal exchanger at a second end; and
   a regulation device adapted to regulate an air flow rate of cool air in the cooling air lead-in conduit, the regulation device including—
      a door shiftably coupled to a panel of the guiding blade, the door being shiftable between an open position in which at least a portion of cool air from the airstream outlet of the fan is deflected into the interior volume of the guiding blade and into the cooling air lead-in conduit, and a closed position in which the cool air from the airstream outlet of the fan is blocked from entering the interior volume of the guiding blade, and therefore the cooling air lead-in conduit.

2. The propulsion unit of claim 1, wherein the internal volume of the guiding blade at least partially forms the cooling air lead-in conduit.

3. The propulsion unit of claim 1, wherein the regulation device further includes an actuation system adapted to modulate the air flow rate of cool air in the cooling air lead-in conduit according to cooling air requirements of the thermal exchanger.

4. The propulsion unit of claim 3, wherein the actuation system comprises a link-rod to shift the door between the open position and the closed position.

5. The propulsion unit of claim 1, wherein the guiding blade is fixedly joined to a bifurcation positioned at the airstream outlet of the fan, the bifurcation separating an outlet airstream from the fan into two secondary streams.

6. The propulsion unit of claim 5, wherein the propulsion unit is adapted for use with an aircraft having a wing, wherein the turbojet engine is coupled to the wing by a fastening mast, and wherein the secondary streams flow respectively along a left flank and a right flank of a fastening mast.

7. The propulsion unit of claim 1, wherein the door has internal travel.

8. The propulsion unit of claim 1, wherein the door has external travel.

9. An aircraft comprising at least one propulsion unit according to claim 1.

* * * * *